United States Patent [19]

Schuon

[11] 4,428,076

[45] Jan. 24, 1984

[54] METHOD OF AND SYSTEM FOR EVALUATING BIT ERRORS IN TESTING A SIGNAL PATH

[75] Inventor: Eberhard Schuon, Eningen, Fed. Rep. of Germany

[73] Assignee: Wandel & Goltermann GmbH & Co., Eningen, Fed. Rep. of Germany

[21] Appl. No.: 330,719

[22] Filed: Dec. 14, 1981

[30] Foreign Application Priority Data

Dec. 16, 1980 [DE] Fed. Rep. of Germany ....... 3047239

[51] Int. Cl.³ .................... H04B 17/00; H04L 1/00
[52] U.S. Cl. .......................................... 371/5; 371/22; 375/10
[58] Field of Search .................. 371/5, 22, 25; 375/10

[56] References Cited

U.S. PATENT DOCUMENTS

| | | | |
|---|---|---|---|
| 4,070,647 | 1/1978 | Robson | 371/5 |
| 4,363,123 | 12/1982 | Grover | 371/5 |
| 4,385,383 | 5/1983 | Karchevski | 371/5 |
| 4,387,461 | 6/1983 | Evans | 371/5 |
| 4,393,499 | 7/1983 | Evans | 371/5 |

Primary Examiner—Charles E. Atkinson
Attorney, Agent, or Firm—Karl F. Ross

[57] ABSTRACT

In order to evaluate the fidelity of a transmission line or other test object, a pseudorandom bit pattern is fed to the input end of that test object and is compared bit by bit with the pattern exiting at its output end. Since independent transmission errors are considered particularly relevant for this evaluation, in contrast to consequential errors following an initial error within a predetermined number of bit cycles, an error pulse emitted by the bit comparator causes the blocking of further error pulses for a selected time interval. The blocking may be effected by a retriggerable monoflop of adjustable off-normal period or by a presettable down counter.

12 Claims, 5 Drawing Figures

METHOD OF AND SYSTEM FOR EVALUATING BIT ERRORS IN TESTING A SIGNAL PATH

FIELD OF THE INVENTION

My present invention relates to a method of and a system for evaluating the bit-transmitting quality or fidelity of a test object such as a transmission line or other signal path.

BACKGROUND OF THE INVENTION

The testing of such a signal path generally involves the feeding of an original bit pattern of limited length, preferably produced by a pseudorandom generator, to an input end of the test object and the bit-by-bit comparison of the transmitted pattern, extracted from the output end of the test object, with a reference sequence identical with the original pattern produced by the same generator or by a duplicate thereof; see, for example, commonly owned U.S. Pat. No. 3,965,294. Whenever the bit comparator detects a disparity, it emits an error pulse which can be counted to provide a measure of the bit-transmitting quality. With a total number of N bit cycles in the test pattern, an error rate $R = n/N$ where n is the number of error pulses.

The conventional evaluation of transmission lines and the like on the basis of this error rate R fails to take into account, however, the fact that in many instances the individual bit errors are not all independent of one another. In PCM transmission using 8-bit code combinations or bytes, for example, an initial bit error often entrains consequential errors in the same code combination. Moreover, a faulty code word can usually be detected by parity checks, with replacement of the entire word by a corrected version regardless of the number of actual bit errors. Thus, it often appears desirable to count a bunch of closely spaced bit errors as a single error for evaluation purposes.

OBJECTS OF THE INVENTION

An object of my present invention, therefore, is to provide a method of facilitating the counting of mutually independent bit errors for use, either alone or in combination with the total number of such errors, in the evaluation of the fidelity of a test object.

A related object is to provide a simple system for carrying out this method.

SUMMARY OF THE INVENTION

In accordance with my present invention, a dependency interval of selected duration is measured upon the occurrence of any error pulse, such an interval encompassing a number $M << N$ of bit cycles. Subtraction of the number of error pulses occurring during any dependency interval from the total number n of such pulses provides a count $n_o$ of mutually independent error pulses which, on being divided by the number N of bit cycles, yields an error rate $R_o$ serving as a measure of bit-transmitting quality.

A system implementing this method in accordance with my invention comprises first counting means having a stepping input coupled to the output of the conventional bit comparator by way of switch means controlled by timing means triggerable by an error pulse for measuring the aforementioned dependency interval, the operation of the switch means by the timing means interrupting the transmission of further error pulses to the stepping input during such interval. A count of the N bit cycles of a test period is furnished by second counting means stepped by clock pulses that are generated by synchronizing means connected to the output of the test object. The two counting means are connected to an evaluator determining the error rate $R_o$.

Advantageously, pursuant to a more particular feature of my invention, the dependecy interval is extended by every new error pulse coinciding therewith; this is readily accomplished by making the timing means retriggerable.

The timing means may be a monostable multivibrator or monoflop which during its off-normal period, i.e. when conducting, cuts off an electronic device serving as the switch means in series with the stepping input of the first counting means. Alternatively, I may design the timing means as a down counter presettable to the number M of bit cycles of the dependency interval by an error pulse from the bit comparator, a back-stepping input of this down counter being connected to the synchronizing means for receiving the clock pulses thereof.

BRIEF DESCRIPTION OF THE DRAWING

The above and other features of my invention will now be described in detail with reference to the accompanying drawing in which.

SPECIFIC DESCRIPTION

Figure 1:
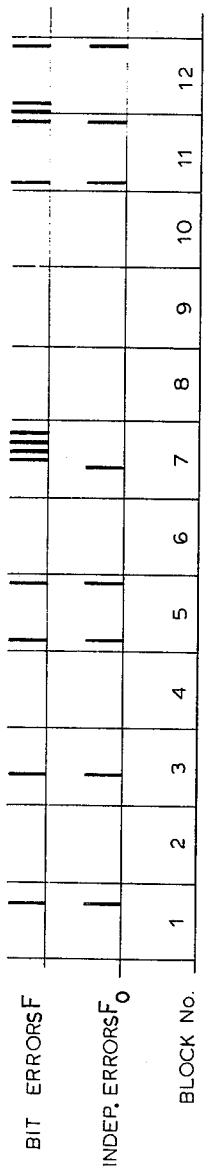
FIG. 1 is a timing diagram serving to explain the principles of my invention.

FIG. 1 shows a bit stream divided into a multiplicity of consecutive blocks of predetermined length each encompassing a multiplicity of bit cycles. Individual errors F are shown to occur in blocks Nos. 1, 3, 5, 7, 11 and 12. The errors in block No. 7, however, are closely bunched and are therefore counted as a single independent error $F_o$; a bunch of errors bridging blocks Nos. 11 and 12 is also counted as a single error $F_o$. On the other hand, a separate pulse widely spaced from another within the same block is independently counted, as seen in blocks 5, 11 and 12. Thus, the resulting error rate $R_o$ is different not only from the aforementioned rate R but also from an error rate obtained when, as already proposed, only faulty blocks are counted and their number is divided by the total number of blocks. It should be noted that the error rate has been greatly exaggerated in FIG. 1; a normal rate would be $R_0 < 10^{-6}$.

Figure 2:
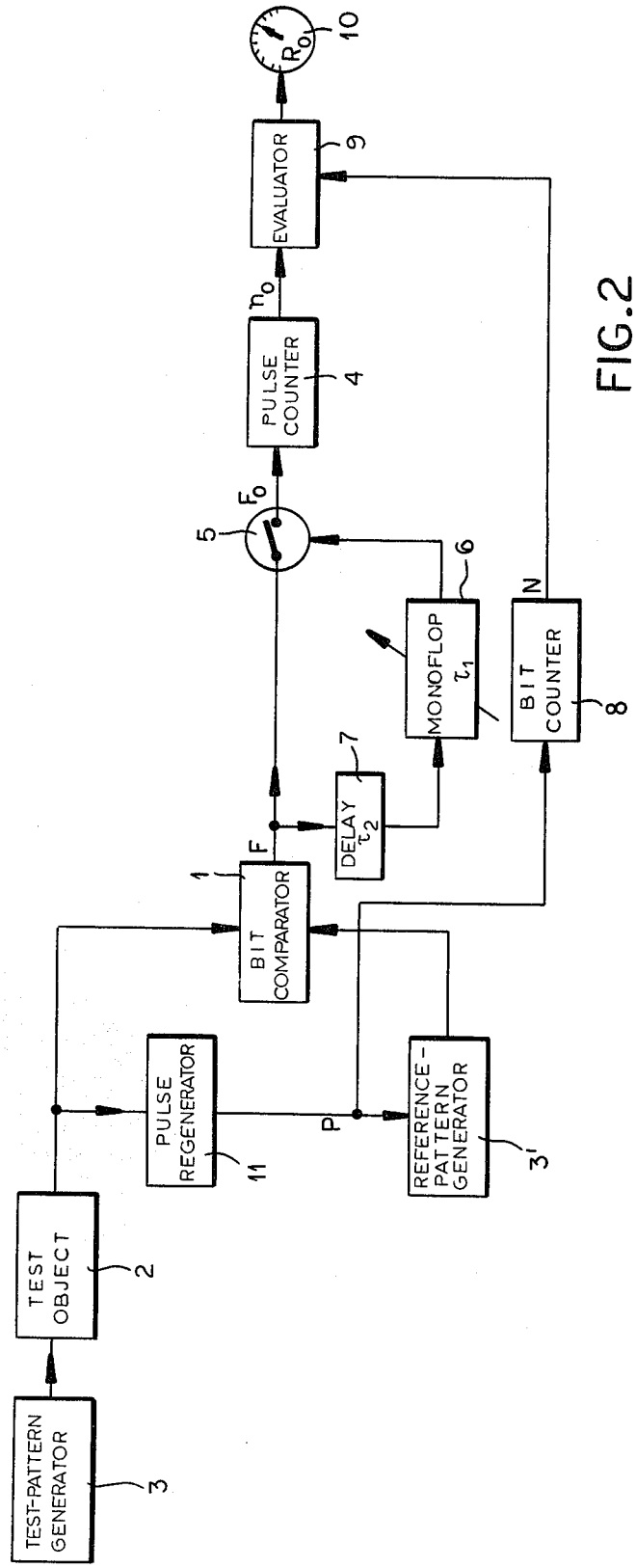
FIG. 2 is a block diagram of an evaluation system according to my invention.

FIG. 2 illustrates a pseudorandom test-pattern generator 3 working into an input end of a test object 2 whose output end is connected on the one hand to an input of a bit comparator 1 and on the other hand to a pulse regenerator 11 emitting a clock pulse P for each bit cycle. These clock pulses step a reference-pattern generator 3' which is identical with generator 3 and works into another input of bit comparator 1. The clock pulses P also drive a bit counter 8 registering the total number N of bit cycles at the end of a test period.

The output of comparator 1 is connected to a stepping input of a pulse counter 4 by way of an electronic switch 5 which is normally closed but is opened for a predetermined dependency interval of duration $\tau_1$ measured by a preferably adjustable monoflop 6. The latter is triggerable by error pulses F from comparator 1 via a delay line 7 which retards these pulses by a time $\tau_2$ sufficient to insure that a pulse triggering the monoflop 6 reaches the counter 4 before switch 5 is opened. Counter 4, therefore, is stepped only by the independent error pulses $F_o$ so as to have a count $n_o$ at the end of the test period. An evaluator 9 receives the counts $n_o$ and N and actuates an indicator 10 displaying the error rate $R_o$.

Figure 2A:
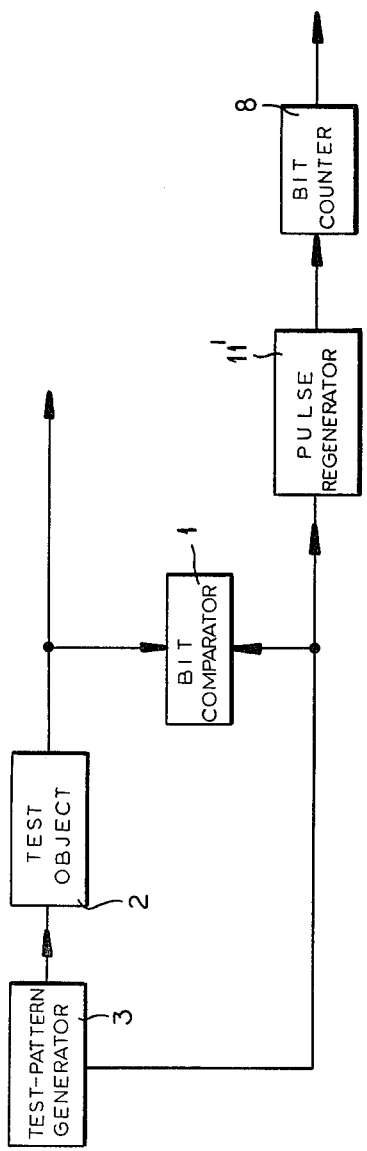
FIG. 2A shows a partial modification of the system of FIG. 2.

As illustrated in FIG. 2A, reference-pattern generator 3' can be replaced by another output connection of original generator 3 which, however, ought to include a delay line if test object 2 transmits the bit pattern from generator 3 with a significant lag. A pulse regenerator 11', driving the bit counter 7, is connected to generator 3 in parallel with bit comparator 1; the system is otherwise identical with that of FIG. 2 and operates in an analogous manner.

Figure 3:
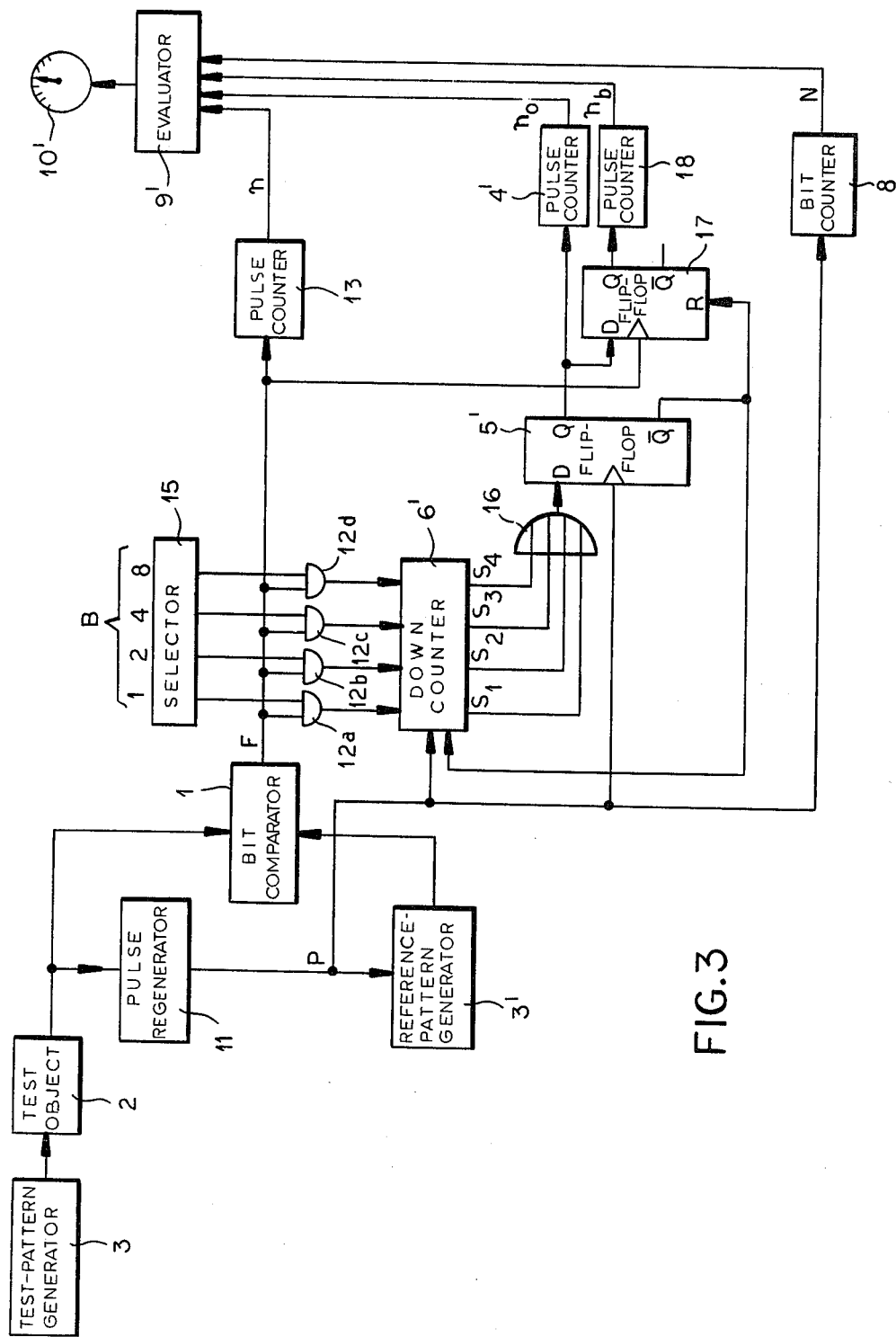
FIG. 3 is a block diagram representing another embodiment of my invention.

The system of FIG. 3 includes the same components 1, 2, 3, 3', 8 and 11 as that of FIG. 2 and, obviously, could also be modified along the lines of FIG. 2A. The error pulses F in the output of bit comparator 1, however, are here fed directly to a pulse counter 13 and in parallel therewith to first inputs of a set of AND gates 12a, 12b, 12c, 12d also having second inputs energizable by a binary selector 15. The latter may be manually operated to unblock one or more of these AND gates in order to let the next error pulse preset respective binary stages of a down counter 6' whose stage outputs $S_1$–$S_4$ are connected to respective inputs of an OR gate 16. A D-type flip-flop 5' has its data input D connected to the output of OR gate 16 and its clock input connected to pulse regenerator 11. A similar flip-flop 17 receives the error pulses F from comparator 1 on its clock input and has its data input D connected to the set output Q of flip-flop 5' in parallel with a stepping input of a pulse counter 4'. The reset output Q of flip-flop 5' is tied to a resetting input R of flip-flop 17 and to a blocking input of down counter 6' whose stepping input receives the clock pulses P from regenerator 11. The set output Q of flip-flop 17 is connected to the stepping input of a further pulse counter 18, all four counters 4', 8, 13 and 18 working into an evaluator 9' connected to a visual indicator 10'.

With selector 15 adjusted to a dependency interval of four clock cycles, for example, AND gates 12a, 12b and 12c are unblocked in preparation for a setting of down counter 6' to a reading of 4. Until the appearance of the first error pulse F in the output of comparator 1, however, counter 6' remains in its zero position so that flip-flop 5' is reset. When such an error pulse occurs, counter 6' is preset to energize its stage outputs $S_1$, $S_2$, $S_3$ whereby voltage is applied via OR gate 16 to input D of flip-flop 5'. The latter is thereupon set by the trailing edge of the clock pulse P coinciding with the error pulse F so that its output Q steps the pulse counter 4'. The setting of flip-flop 5' also energizes the data input D of flip-flop 17 which is set if another error pulse F appears in that condition. Such other error pulse F also restores the preset reading 4 to counter 6' if it had previously been stepped down by one or more clock pulses P.

Figure 4:
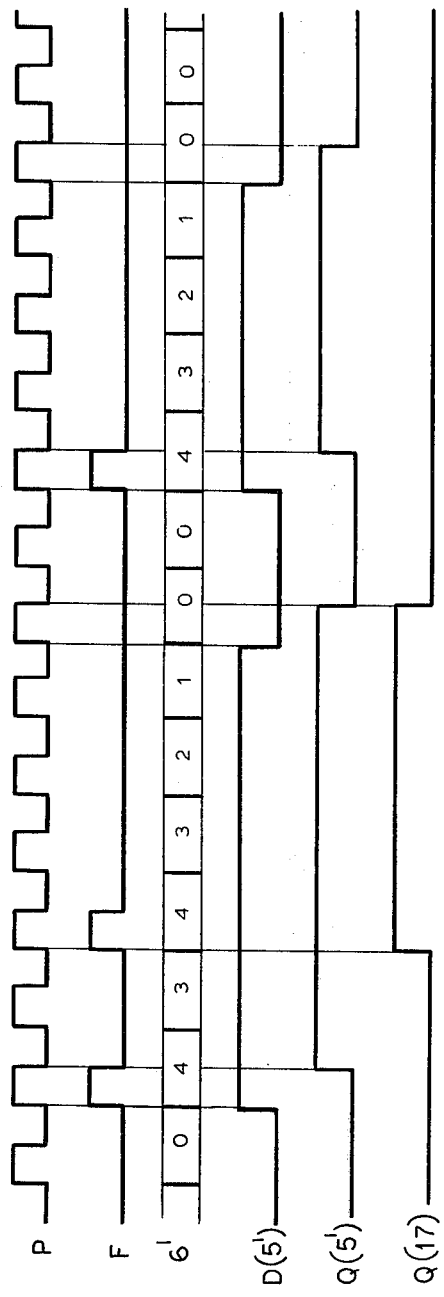
FIG. 4 is a set of graphs relating to the operation of the system of FIG. 3.

For a more detailed description of the operation of the system of FIG. 3, reference will now be made to FIG. 4 whose top graph shows the periodically recurring block pulses P emitted by regenerator 11. Certain of these clock pulses coincide with error pulses F as indicated on the second graph. The third graph gives the setting of down counter 6' which registers a count of 4 upon the appearance of the first error pulse and takes one step back by the next clock pulse, being thereafter returned to its previous count by the second error pulse. Such an interval is initiated by the conduction of Or gate 16, which energizes the data input of flip-flop 5' as shown in the fourth graph, but does not become effective until the appearance of the trailing edge of the clock pulse coinciding with the error pulse; this sets the flip-flop as indicated in the fifth graph. The dependency interval here considered lasts for six bit cycles, instead of the usual four, on account of its extension by the second error pulse. This second pulse, furthermore, sets the flip-flop 17 as shown in the bottom graph of FIG. 4. Thus, counters 4' and 18 are both stepped by the setting of the two flip-flops.

The clock pulse P stepping the counter 6' down to zero also de-energizes the data input of flip-flop 5' which is therefore reset by the trailing edge of that clock pulse; this also resets the flip-flop 17. Upon the occurrence of a further error pulse F, a new dependency interval is started with the setting of flip-flop 5'; since no other error pulse appears during that interval, flip-flop 17 remains reset and the interval terminates after four clock pulses.

At the end of the test period, evaluator 9 has available the total bit count N from counter 8, the total number n of error pulses from counter 13, the number $n_o$ of independent errors from counter 4', and a reading $n_b$ from counter 18 representing a count of bunched errors, i.e. the number of groups of two or more errors occurring close to one another so as to be considered mutually dependent. Indicator 10' may in this instance display, concurrently or upon switchover, separate ratios $R = n/N$, $R_o = n_o/N$ and $R_b = n_b/N$ to be taken into account in determining the transmission quality of test object 2.

I claim:
1. A method of evaluating the bit-transmitting quality of a test object, comprising the steps of:
 (a) feeding an original bit pattern of limited length, consisting of N bit cycles, to an input end of a test object;
 (b) extracting a transmitted bit pattern from an output end of the test object;
 (c) comparing a reference sequence identical with the original pattern bit by bit with the transmitted pattern and generating an error pulse upon detecting a disparity in any bit cycle;
 (d) measuring a dependency interval of selected duration, encompassing a number $M << N$ of bit cycles, upon the occurrence of any error pulse;
 (e) subtracting the number of error pulses occurring during any dependency interval of step (d) from the total number n of error pulses generated in step (c) to provide a count $n_o$ of mutually independent error pulses; and
 (f) dividing the count $n_o$ by the number N of bit cycles to obtain a measure of said bit-transmitting quality.
2. A method as defined in claim 1 wherein the dependency interval of step (d) is extended wit every error pulse occurring during such interval.
3. A method as defined in claim 2, comprising the further step of separately counting the number of extended dependency intervals as an aid to evaluation.

4. A method as defined in claim 1, 2 or 3, comprising the further step of separately counting the total number n of error pulses as an aid to evaluation.

5. A system for evaluating the bit-transmitting quality of a test object, comprising:
a source of a bit pattern of limited length, consisting of N bit cycles, connected to an input end of a test object to be evaluated;
a bit comparator having one input connected to an output end of said test object and another input connected to circuitry emitting a reference sequence identical with said bit pattern, said bit comparator having an output producing an error pulse upon detecting a disparity in any bit cycle;
first counting means having a stepping input coupled to the output of said bit comparator;
switch means in the coupling between said bit comparator and said first counting means;
timing means triggerable by an error pulse from said bit comparator for measuring a dependency interval of selected duration, encompassing a number $M<<N$ of bit cycles, for operating said switch means to interrupt the transmission of further error pulses to said stepping input during said dependency interval;
synchronizing means connected to the output end of said test object for generating a clock pulse during each bit cycle;
second counting means stepped by said clock pulses for registering a count of said N bit cycles; and
evaluation means connected to said first and second counting means for determining a ratio $n_o/N$ where $n_o$ is the number of error pulses fed to said first counting means.

6. A system as defined in claim 5 wherein said timing means is retriggerable by an error pulse occurring during a dependency interval for extending the duration of the latter.

7. A system as defined in claim 5 or 6 wherein said timing means comprises a monoflop, said switch means being a normally conductng electronic device cut off during conduction of said monoflop.

8. A system as defined in claim 7 wherein said monoflop has an input connected to the output of said bit comparator via delay means preventing the cutoff of said switch means before a stepping of said first counting means by an error pulse triggering said monoflop.

9. A system as defined in claim 5 or 6 wherein said timing means comprises a down counter presettable to said number M of bit cycles by an error pulse from said bit comparator and provided with a back-stepping input connected to said synchronizing means.

10. A system as defined in claim 9 wherein said timing means further comprises a flip-flop settable in a nonzero position of said down counter and resettable in a zero position thereof by clock pulses from said synchronizing means.

11. A system as defined in claim 10, further comprising a second flip-flop settable by an error pulse from said bit comparator in the set state of the first-mentioned flip-flop and resettable upon a resetting of the latter, and third counting means stepped by said second flip-flop for registering the number of dependency intervals coinciding with at least one error pulse not registered by said first counting means, said third counting means being connected to said evaluation means.

12. A system as defined in claim 11, further comprising fourth counting means connected to said evaluation means and stepped directly by said bit comparator for registering the total number of error pulses.

* * * * *